(12) United States Patent
Rajamony et al.

(10) Patent No.: US 7,370,155 B2
(45) Date of Patent: May 6, 2008

(54) CHAINED CACHE COHERENCY STATES FOR SEQUENTIAL HOMOGENEOUS ACCESS TO A CACHE LINE WITH OUTSTANDING DATA RESPONSE

(75) Inventors: Ramakrishnan Rajamony, Austin, TX (US); Hazim Shafi, Austin, TX (US); Derek Edward Williams, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/245,313

(22) Filed: Oct. 6, 2005

(65) Prior Publication Data

US 2007/0083717 A1 Apr. 12, 2007

(51) Int. Cl.
*G06F 12/00* (2006.01)
(52) U.S. Cl. .................. 711/141; 711/124; 711/146; 709/216
(58) Field of Classification Search .............. 711/141
See application file for complete search history.

(56) References Cited

U.S. PATENT DOCUMENTS

2002/0078310 A1* 6/2002 Frank et al. ............... 711/148
2004/0030842 A1* 2/2004 Cypher ..................... 711/145
2004/0093467 A1* 5/2004 Shen et al. ................ 711/141

* cited by examiner

*Primary Examiner*—Donald Sparks
*Assistant Examiner*—Hashem Farrokh
(74) *Attorney, Agent, or Firm*—Casmier K. Salys; Dillon & Yudell LLP (57) ABSTRACT

A method and data processing system for sequentially coupling successive, homogenous processor requests for a cache line in a chain before the data is received in the cache of a first processor within the chain. Chained intermediate coherency states are assigned to track the chain of processor requests and subsequent access permission provided, prior to receipt of the data at the first processor starting the chain. The chained intermediate coherency state assigned identifies the processor operation and a directional identifier identifies the processor to which the cache line is to be forwarded. When the data is received at the cache of the first processor within the chain, the first processor completes its operation on (or with) the data and then forwards the data to the next processor in the chain. The chain is immediately stopped when a non-homogenous operation is snooped by the last-in-chain processor.

9 Claims, 9 Drawing Sheets

| Level | Request/Operation Type | P0 | P1 | P2 | P3 |
|---|---|---|---|---|---|
| 0 | Initial States | M | — | — | — |
| 1 | P1 RWITM (P0 responds and provides data to P1) | Go $M_R$,I | $M_R$ | — | — |
| 2 | P2 RWITM (data move to P1 pending) | — | Go, $M_R$, $M_{F2}$ | $M_R$ | — |
| 3 | P3 RWITM (data move to P1,P2 pending) | — | $M_{F2}$ | Go $M_R$, $M_{F3}$ | $M_R$ |
| 4 | data to P1 complete (P1 forwards data to P2) | — | — | $M_{F3}$ | $M_R$ |
| 5 | data to P2 complete (P2 forwards data to P3) | — | — | — | $M_R$ |
| 6 | data move to P3 complete | — | — | — | M |

FIG. 3A

| Level | Request/Operation Type 303B | P0 | P1 | P2 | P3 |
|---|---|---|---|---|---|
| 0 | Initial States | M/E | — | — | — |
| 1 | P1 READ (P0 responds and provides data to P1) | Go $S_R$, S | $S_R$ | — | — |
| 2 | P2 READ (data move to P1 pending) | S | Go $S_R$, $S_{F2}$ | $S_R$ | — |
| 3 | P3 READ (data move to P1,P2 pending) | S | $S_{F2}$ | Go $S_R$, $S_{F3}$ | $S_R$ |
| 4 | data to P1 complete (P1 forwards data to P2) | S | S | $S_{F3}$ | $S_R$ |
| 5 | data to P2 complete (P2 forwards data to P3) | S | S | S | $S_R$ |
| 6 | Data move to P3 complete | S | S | S | S |

FIG. 3B

| Level | Request/Operation Type | P0 | P1 | P2 | P3 |
|---|---|---|---|---|---|
| 0 | Initial States | M | — | — | — |
| 1 | P1 RWITM (P0 responds and provides data to P1) | Go $M_R$, I | $M_R$ | — | — |
| 2 | P2 RWITM (data move to P1 pending) | — | Go $M_R$, $M_{F2}$ | $M_R$ | — |
| 3 | P3 Read (data move to P1, P2 pending) | — | $M_{F2}$ | Retry, $M_{NC}$ | — |
| 4 | data to P1 complete (P1 forwards data to P2) | — | — | $M_{NC}$ | — |
| 5 | data to P2 complete (P2 completes chain) | — | — | M | — |
| 6 | P3 Read (P2 responds and provides data to P3) | — | — | Go $S_R$, S | $S_R$ |
| 7 | data to P3 complete | — | — | S | S |

FIG. 3C

| Level 301 | Request/Operation Type 303B | P0 | P1 | P2 | P3 |
|---|---|---|---|---|---|
| 0 | Initial States | M/E | — | — | — |
| 1 | P1 READ (P0 responds and provides data to P1) | Go S_R, S | S_R | — | — |
| 2 | P2 READ (data move to P1 pending) | S | Go S_R, S_F2 | S_R | — |
| 3 | P3 RWITM (data move to P1/P2 pending) | S | S_F2 | Retry, S_NC | — |
| 4 | data move to P1 complete (P1 forwards data to P2) | S | S | S_NC | — |
| 5 | data move to P2 complete (P2 completes chain) | S | S | S | — |
| 6 | P3 RWITM (P2 responds and provides data to P3) | — | — | Go M_R, I | M_R |
| 7 | Data move to P3 complete | — | — | — | M |

| CURRENT STATE | SNOOPS | | | |
|---|---|---|---|---|
| | RWITM | READ | D CLAIM | RECEIVE DATA |
| M | Go $M_R$ Intv, I | Go $S_R$ Intv, S | Illegal | N/A |
| E | Go $M_R$ Intv, I | Go $S_R$ Intv, S | Illegal | N/A |
| S | I | NR | I | N/A |
| I | NR | NR | NR | N/A |
| $M_R$ | Go $M_R$ Intv, $M_{FX}$ | Retry, $M_{NC}$ | Illegal | Data to processor, M |
| $M_{FX}$ | NR | NR | Illegal | Fwd data to core, fwd data to downstream chip, I |
| $S_R$ | Retry, $S_{NC}$ | Go $S_R$ Intv, $S_{FX}$ | Retry, $S_{NC}$ | Fwd data to core, S/E |
| $S_{FX}$ | NR | NR | NR | Fwd data to core, fwd data to downstream chip, S |
| $M_{NC}$ | Retry | Retry | Illegal | Fwd data to core, M |
| $S_{NC}$ | NR | NR | NR | Fwd data to core, S |

FIG. 5

CHAINED CACHE COHERENCY STATES FOR SEQUENTIAL HOMOGENEOUS ACCESS TO A CACHE LINE WITH OUTSTANDING DATA RESPONSE

GOVERNMENT SUPPORT UNDER NBCHC020056

This invention was made with Government support under NBCHC020056 awarded by Defense Advanced Research Project Agency. The Government has certain rights in this invention.

RELATED APPLICATION(S)

The present invention is related to the subject matter of the following commonly assigned, co-pending U.S. patent application: Ser. No.: 11/245,312 entitled "CHAINED CACHE COHERENCY STATES FOR SUCCESSIVE NON-HOMOGENEOUS ACCESS TO A CACHE LINE WITH OUTSTANDING DATA RESPONSE" filed concurrently herewith. The content of the above-referenced application is incorporated herein by reference.

BACKGROUND OF THE INVENTION

1. Technical Field

The present invention relates generally to data processing systems and in particular to cache coherency operations within a multiprocessor data processing system (MP). Still more particularly, the present invention relates to chained intermediate coherency states for homogenous operations involving sequential accesses of a single cache line by multiple processors in an MP.

2. Description of the Related Art

A conventional multiprocessor data processing system (referred to hereinafter as an MP), typically comprises a system memory, input/output (I/O) devices, a plurality of processing elements that each include a processor and one or more levels of high-speed cache memory, and a system interconnect coupling the processing elements to each other and to the system memory and I/O devices. The processors may utilize common instruction sets and communication protocols, have similar hardware architectures, and may generally be provided with similar memory hierarchies.

Caches are commonly used to temporarily store values that might be repeatedly accessed by a processor, in order to speed up processing by avoiding the longer step of loading the values from memory. Each cache comprises a cache array, cache directory and an associated cache controller that manages the transfer of data and instructions between the processor core or system memory and the cache. Typically, the cache directory also contains a series of bits utilized to track the coherency states of the data in the cache. In addition, during certain operations, a controlling "intermediate coherency state" that overrides the directory state for the cache line may be maintained by the cache controller logic during the completion of the operation.

With multiple caches within the memory hierarchy, a coherent structure is required for valid execution results in the MP. This coherent structure provides a single view of the contents of memory to all of the processors and other memory access devices, e.g., I/O devices. A coherent memory hierarchy is maintained through the use of a coherency protocol, such as the MESI protocol. In the MESI protocol, an indication of a coherency state is stored in association with each coherency granule (e.g., cache line or sector) of at least all upper level (cache) memories. Each coherency granule can have one of the four MESI states, which is indicated by bits in the cache directory's SRAM or by intermediate coherency states within the cache controller.

In the MESI protocol, a cache line of data may be tagged with one of four states: "M" (Modified), "E" (Exclusive), "S" (Shared) or "I" (Invalid). The modified state indicates that a coherency granule is valid only in the cache storing the modified coherency granule and that the value of the modified coherency granule has not been written to system memory. When a coherency granule is indicated as exclusive, then only that cache has the coherency granule. The data in the exclusive state is consistent with system memory, however. If a coherency granule is marked as shared in a cache directory, the coherency granule is resident in the associated cache and potentially one or more other caches within the memory hierarchy, and all of the copies of the coherency granule are consistent with system memory and one another. Finally, the invalid state indicates that the data and address tag associated with a coherency granule are both invalid.

It is important to note that the present application makes a distinction between "instructions" that a processing element may execute, for example, to load data from a memory location or to store new data into a memory location and the "operations" these instructions may cause on the system interconnect linking the various processing elements within an MP. For example, a load instruction may, in the event of a cache miss, cause a READ operation on the system interconnect to be issued from the processing element executing the load instruction. The READ operation on the system interconnect causes a current copy of the data to be delivered to the issuing processing element and informs the other participants in the SMP that the data is merely being read, but not modified. If a load instruction hits in a cache, typically no operation is generated on the system interconnect and the data is returned to the processing element from the cache directly.

As another example, when a store instruction is executed and misses the cache, a RWITM (Read With Intent to Modify) operation is typically generated on the system interconnect. A RWITM operation on the system interconnect causes a current copy of the data to be delivered to the issuing processing element and informs any other participants in the SMP to invalidate their copies as they are about to become stale. If, however, the store instruction hits the line in the cache in a shared state, it typically issues a DCLAIM operation. The DCLAIM operation informs the other participants that the issuing cache wishes to gain ownership to update the cache line and that they should invalidate their copies. The DCLAIM operation does not return a copy of the cache line to the issuing cache since the issuing cache has a current copy of the line already. If the store instruction hits an M or E line in the cache, the line is owned, and only present in the current cache. The cache controller logic updates the line immediately and sets the cache state to M if the line was in the E state (the cache line is no longer consistent with memory and therefore cannot be left in the E state).

The state to which each coherency granule (e.g., cache line) is set is dependent upon both a previous coherency state of the data within the cache line and the type of memory access request received from a requesting device (e.g., the processor). Accordingly, maintaining memory coherency in the MP requires that the processors communicate messages across the system bus indicating their intention to read or to update a memory location. For example, when a processor desires to write a memory location, the processor must first inform all other processing elements of its intention to update the data in the memory location and receive permission from all other processing elements to carry out the update operation. The permission messages received by the requesting processor indicate that all other cached copies of the contents of the memory location have been invalidated, thereby guaranteeing that the other processors will not access a now stale local copy of the data.

Typical system interconnects are comprised of two distinct parts: an address portion utilized to transmit operations and individual and combined responses for those operations and a data portion utilized to transfer data between participants in the system. An operation is first broadcast on the address portion of the system interconnect. As the operation is broadcast, at each participant, an individual partial response to the operation is generated and these partial responses are combined into a "combined response" that is then broadcast to all the participants in the MP. The combined response indicates the overall success or failure of the requested operation. The time from the broadcast of the operation onto the address portion of the system interconnect to the receipt of the combined response by a participant is referred to as the "address tenure" for the operation.

Typical operations that affect the coherency state of cache lines include READs, RWITMs, DCLAIMs, and CASTOUTs (CO). A castout operation is used to evict a modified cache line back to main memory from a cache when a new line is being brought in a cache and is displacing the modified line.

Some operations, such as the DCLAIM operation described above, only require an address tenure to complete because no data is transferred. However, other operations, such as READ and RWITM, also require a subsequent data tenure on the data portion of the system interconnect after successful completion of the address tenure, in order to transfer data from one participant to another within the system. The data tenure for an operation commences when the data is placed on the data portion of the system interconnect from the sourcing participant and concludes when all the data is received and processed at the requesting participant.

Address operations on the address portion of the system interconnect are often allowed to proceed independently from data tenures in a pipelined fashion. In other words, subsequent address tenures can occur on the address portion of the system interconnect concurrently with a data tenure occurring on the data portion of the system interconnect that is associated with a previously successful address tenure. Such interconnects are commonly referred to as a "split-transaction" interconnect and are well known to those skilled in the art.

A data transfer operation usually consists of an address tenure and a data tenure between two participants: a sourcing participant and a requesting participant. To effect the data transfer, the requesting participant places a bus operation such as a READ or RWITM on the system interconnect requesting a copy of the line and, in the case of a RWITM, ownership permission to update a memory location within the cache line. During the address tenure of the request, other participants snoop the operation, produce a partial response, and, if possible, perform steps necessary to honor the request. The other participants utilize the partial response to indicate their ability to honor the request. In particular, for a cache-to-cache transfer, a cache with a current copy of the cache line activates cache controller logic necessary to deliver the data requested if appropriate and becomes the tentative sourcing participant. Other participant caches indicate their ability to remove the cache line if necessary (for example, for a RWITM).

If a participant cannot honor a request, the participant generates a "retry" response. This response indicates that the participant cannot honor the request for whatever reason and that the request should be retried again at a later time. At the conclusion of the request address tenure, the combined response is generated from the individual partial responses and broadcast to the participants to indicate whether or not the request can be fulfilled. If the request cannot be fulfilled for some reason, the requesting master re-attempts the request at a later time and the tentative sourcing participant, if any, is released with no transfer occurring.

However, if the cache-to-cache data request can be fulfilled the cache control logic in the sourcing participant initiates a data tenure on the data portion of the system interconnect and transfers the data from the sourcing cache to the destination cache. Such a cache-to-cache transfer is referred to as an "intervention". The data tenure completes when the data is received and processed by cache controller logic in the receiving participant. During the data transfer operation (address and data tenure), the cache directories for both the source and destination cache are updated to the proper coherency state based on the current states of the caches and the type of operation involved (i.e. READ or RWITM).

Typically, during the address and data tenure for a data transfer operation, subsequent address tenures targeted at the same cache line as the data transfer from other participants are retried. This is because the line is currently being transferred from one cache to another and is in a state of transition and the cache directory states are being updated. The data and address tenures for a given data transfer operation between a given sourcing and destination participant must typically be completed before subsequent data transfer operations for the given cache line may be processed.

While the above has described data transfers from one cache to another, those skilled in the art will appreciate that the memory controller can also source data to a requesting cache in a manner similar to that used when a sourcing cache intervenes to a destination cache. Transfers sourced from a memory controller proceed in the same manner as cache-to-cache transfers except that control logic in the memory controller is responsible for snooping the operation and for initiating the data tenure and no state update is performed in the memory controller, because coherency state information is not maintained within the memory controller.

As more processors are added on a bus, and depending on the application being run, there may be contention among processors for certain cache lines, such as those containing synchronization objects, etc. Each requesting processor continues to put the same request on the bus until access to the cache line data is provided to the requesting process. In such cases, a substantial amount of bus bandwidth is wasted on requests that have to be continually retried. The system bus becomes bogged down with this cycle of repeated access requests and associated retry responses.

Also, there is currently no way for the cache with current ownership of the cache line data to know/keep track of which request from the multiple requesting processors was snooped first. The processor that is sent the cache line following the completion of the data tenure may not be the processor who first requested the line. Inefficiencies are thus built into MPs that utilize the currently available MESI coherency protocol to track and coordinate data access operations within the memory hierarchy.

The present invention recognizes that it would be desirable to provide a method and system by which the latency of coherency response for subsequent, successive/sequential accesses to a cache line is hidden or substantially reduced. A cache coherency protocol that allows for continued coherency operations while the data is still being transferred to a previous master's cache would be a welcomed improvement. The invention further recognizes the desirability of reducing cyclical requests and retries on the system bus between a device requesting the cache line data and the master device when the master device does not yet have the data within its cache. These and other features are provided by the invention described herein.

SUMMARY OF THE INVENTION

Disclosed is a method and system for chaining (or sequentially coupling) cache coherency operations for successive, homogenous requests to access a cache line by multiple processors in an MP before the data is transferred into (or updated in) the cache of a first processor in the chain. Access permission to the cache line data is immediately assigned to a requesting processor following a snoop by the last processor in the chain of the address tenure associated with the request. The access permission is assigned and recorded via a chained intermediate cache coherency state within the cache controller logic before the actual data transfer occurs. The occurrence of unnecessarily retried address tenures while the current cache at the end of the chain is waiting to receive data is eliminated.

The invention takes advantage of the bifurcated address and data tenures of conventional data operations and implements a sequential chaining of future cache line accesses (or access permissions) by the different processors that sequentially request access permission to the cache line data. The chain is established by processing address tenures from the subsequent caches in the chain that may occur while a previous data tenure or tenures in the chain is completing. The processors are given pending/chained access (exclusive or shared ownership depending on the type of request issued) in a sequential manner as the data is later passed in sequence from one chained processor's cache to the next.

When the data is received in the first cache within the chain, the processor completes its operation on (or with) the data and then the data is immediately forwarded to the next processor in the chain. If the series of operations chained together are to modify the data, the coherency state of the cache line of the issuing processor's cache is changed to the invalid (I) state after the data is forwarded. If the series of operations chained together are to read the data, the coherency state of the cache line of the issuing processor's cache is changed to the Shared (S) state after the data is forwarded.

In order to track the chaining of coherency operations as well as the various responses for both types of operations, the invention provides a chained coherency protocol, which is based on a standard coherency protocol, such as the MESI protocol (or other standard protocol), extended to include chained intermediate coherency states. The chained-MESI coherency protocol includes several new states in addition to the standard MESI states. These new chained intermediate coherency states are held by the cache controller logic while a processor is waiting to receive data or to complete a data transfer operation and provide an indication of where (to which requesting processor's cache) data received in the cache line is to be routed following completion of operations by the current processor on the cache line data. That is, the chained intermediate coherency states provide an addressing function for the routing of data that was requested before the data is received in the current processor's cache. The new, chained intermediate states also indicate whether the data is being modified or shared by the current processor and subsequent processor.

Several states are defined when chaining together sequential homogenous processor requests (e.g., Read operation to Read operation). These states include a first chained coherency state that indicates to a first processor that a second processor has been chained/selected as the processor to which the cache line data is to be sent after the data arrives in the first processor's cache. Associated with the first chained coherency state is a second chained coherency state that indicates to the second processor (and last processor in the chain) that it has been given access to the cache line data but must wait to receive the data from a previous (second-to-last) processor's cache. More than one processor cache may have a cache line in the first coherency state, but only the last processor in the chain is given the second coherency state. This enables the chain to pass from one processor to the next until the last processor request is acknowledged.

Each processor cache tagged with the first state is also provided routing information for the next processor in the chain. The first processor in the chain (or the forwarding processor) and each subsequent processor tracks which processor is next in sequence to receive the cache line data. This involves recording an identifier of the processor, whose request was first snooped and acknowledged. Thus, in addition to the coherency state bits provided within the cache controller logic to uniquely identify each of the chained coherency states, an additional register (or set of bits) are provided to store the address or identification (ID) of the processor to which the data is to be forwarded when received at the cache.

When the processor requests are RWITMs, the above chained intermediate coherency states are: modified-forwarded ($M_F$), which is the first chained coherency state; and modified-waiting to receive data ($M_R$), which is the second chained coherency state. However, when the processor operations are READs of the cache line, the chained intermediate coherency states are: shared-forwarded ($S_F$), which is a third chained coherency state; and shared-waiting to receive data ($S_R$), which is a fourth chained coherency state. Two additional chained intermediate coherency states are provided to prevent chaining of a snooped non-homogenous request. These are modified, end-of-chain ($M_{NC}$) and shared, end-of-chain ($S_{NC}$).

The utilization of chained intermediate coherency states and operations alerts the requesting processor that the cache line will be provided data when all prior requests for the line (from other devices) have been performed. This results in a substantial reduction in the number of requests that are retried. Contention for data and bandwidth problems when there are multiple competing requests for a single cache line are resolved in a systematic and sequential manner.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

General Overview

The improved method and system of the present invention, which relates generally to coherency states of cache lines, is particularly directed to the handling of processor (and system) coherency operations (including responses and updates to coherency states) when the data for the cache line being sourced to another cache is not yet available within the cache line. The invention provides a method and system for chaining (or sequentially coupling) cache coherency operations for successive, homogenous requests to access a cache line by multiple processors in a multiprocessor data processing system (MP) before the data is transferred into (or updated in) the cache of a first processor in the chain. Access permission to the cache line data is immediately assigned to a processor whose request is snooped on the address bus by the last processor in the chain. The access permission is assigned and recorded via chained intermediate coherency states within the cache control logic in both processors before the actual data transfer occurs.

Cache coherence is arrived at on receipt of a combined response rather than on receipt of data. However, final completion of a data transfer operation on the cache line data occurs when the data tenure is completed (or on the completion of the address tenure for a DCLAIM operation or any other address tenure only operation) and the data is resident in the requesting processor's cache. The forward transfer of the data to a next sequential processor in the chain only occurs after the data transfer operation to the current processor in the chain is completed and processed.

The invention capitalizes on the fact that all data operations within the caches and memory include an address tenure on the address portion of the system interconnect followed by a data tenure on the data portion of the system interconnect. It should be noted that the invention applies only to specific sequential data requests (or processor operations). Certain conventional data operations are still completed according to the standard MESI coherency protocol (or other standard coherency protocol). The invention makes use of chained intermediate cache coherency states maintained within the cache controller logic of the caches within the chain to mediate the chained data transfer operations. Upon completion of a chained cache transfer, the directory of the sourcing cache is updated to one of the conventional MESI states based on the nature of the transfer that occurred, and the intermediate state is no longer used. The intermediate states are used by subsequent caches in the chain whose address tenures have been completed and been assigned tentative ownership of the line in the coherency chain to manage the chained transfers. The chained caches use the intermediate states to determine which cache, if any, to pass the data on to, what state to leave the directory of the current cache in once a processor is removed from the chain, and whether it is permitted to continue to add other caches to the chain. The last chained processor handles any snooped requests for that line and is identified via a particular chained coherency state, representative of the end of the chain (i.e., the last link in the coherent chain).

Homogenous operations involve similar operations on a cache line, e.g. a load instruction by a first processor reading data from the cache line followed by a load instruction by a second, subsequent processor in the chain reading data from the cache line or a store instruction by a first processor updating data within the cache line followed by a store instruction by a second processor in the chain updating data within the cache line. In contrast, non-homogenous operations involve load instructions followed by store instructions, or vice-versa. As is further described below, the invention includes a first set of coherency responses for homogenous operations. When a non-homogenous operation is encountered, the chaining of operations is stopped.

When the homogenous processor requests are RWITM and DCLAIM, the new chained coherency states are: modified-forwarded ($M_F$) and modified-waiting to receive data ($M_R$). When the processor operations involve only a READ of the cache line in response to load instructions, the chained coherency states are: shared-forwarded ($S_F$) and shared-waiting to receive data ($S_R$). Two additional coherency states are provided to prevent chaining of a snooped non-homogenous request. These are modified, end-of-chain (or no chain) ($M_{NC}$) and shared, end-of-chain ($S_{NC}$).

Hardware Considerations

Figure 1:
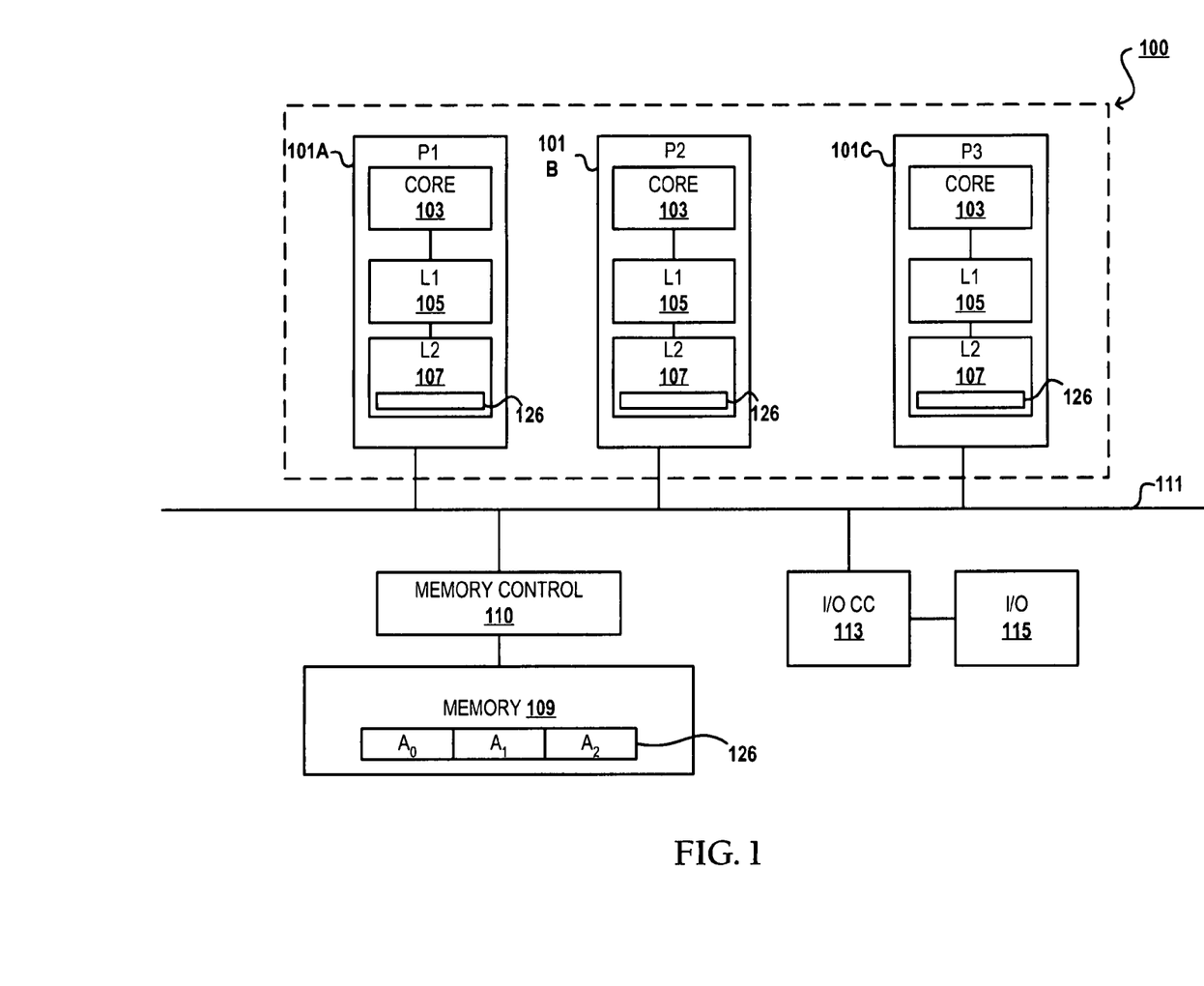
FIG. 1 depicts an illustrative embodiment of a multiprocessor data processing system with a coherent cache memory configuration within which the features of the present invention may advantageously be utilized.

With reference now the figures and in particular to FIG. 1, there is illustrated a multi-processor data processing system (MP) 100. MP 100 comprises several major components including three processing units 101, namely P1, P2 and P3, memory 109, and I/O device(s) 115. I/O device(s) have an associated I/O controller 113, while memory 109 has an associated memory controller 110 that controls access to and from memory 109.

Processing units 101 are connected to memory 109 and I/O devices 115 via system interconnect (system bus) 111 by which processing units 101 communicate with each other and with memory 109, I/O devices 115, and other peripheral devices. System interconnect 111 is typically a bifurcated bus with a data bus for routing data and a separate address bus for routing address transactions and responses. Processing units 101 may also communicate with memory via direct memory access (DMA) channels (not shown).

P1, P2 and P3 each include processor core 103, and onboard L1 cache 105 and L2 cache 107. According to the described implementation, L2 cache 107 supports intervention. Further, each cache is designed to complete coherency operations according to the chained-MESI coherency protocol described herein.

The present invention is described with reference to MP 100 and component parts of MP 100 of FIG. 1, but the present invention may be applied to different configurations of data processing systems that are not necessarily conventional. As an example, MP 100 could include new hardware components not shown in FIG. 1, or have a novel interconnect architecture for existing components. MP 100 may also have more than three processing units.

The various features of the invention are carried out within caches and occur on specific cache lines stored within those caches. For illustrative purposes, a sample cache line "A" is provided. As illustrated within L2 cache 107 of FIG. 1, exemplary cache line A 126 may comprise three blocks of data, $A_0$, $A_1$, and $A_2$, corresponding to words or double words which are individually updatable by any one of the processors. In one embodiment of the invention, updates/modification to specific blocks within the cache line may be carried out by specific processors. For these modifications to be completed, however, the entire cache line must be retrieved by the updating processor. For simplicity, the invention will reference updates or modifications to cache lines as modifications to the entire cache line and not specific blocks of the cache line. Also, the specific size of each cache line 126 and number of data blocks may differ from system to system (or cache to cache) and is not directly relevant to the implementation of the invention.

Additionally, as will become apparent, the present invention may be utilized at any processor level cache (L1, L2, etc.) in a multi-level cache architecture, although the cache architecture need not be a multi-level one. Furthermore, the invention may also be implemented within a non-uniform memory access (NUMA) system, wherein the system memory (RAM) is divided among two or more memory arrays (having separate memory controllers connected to the system bus) and allocated among the processing units. Therefore, those skilled in the art will appreciate that the present invention is not limited to the generalized system shown in FIG. 1.

Figure 2:
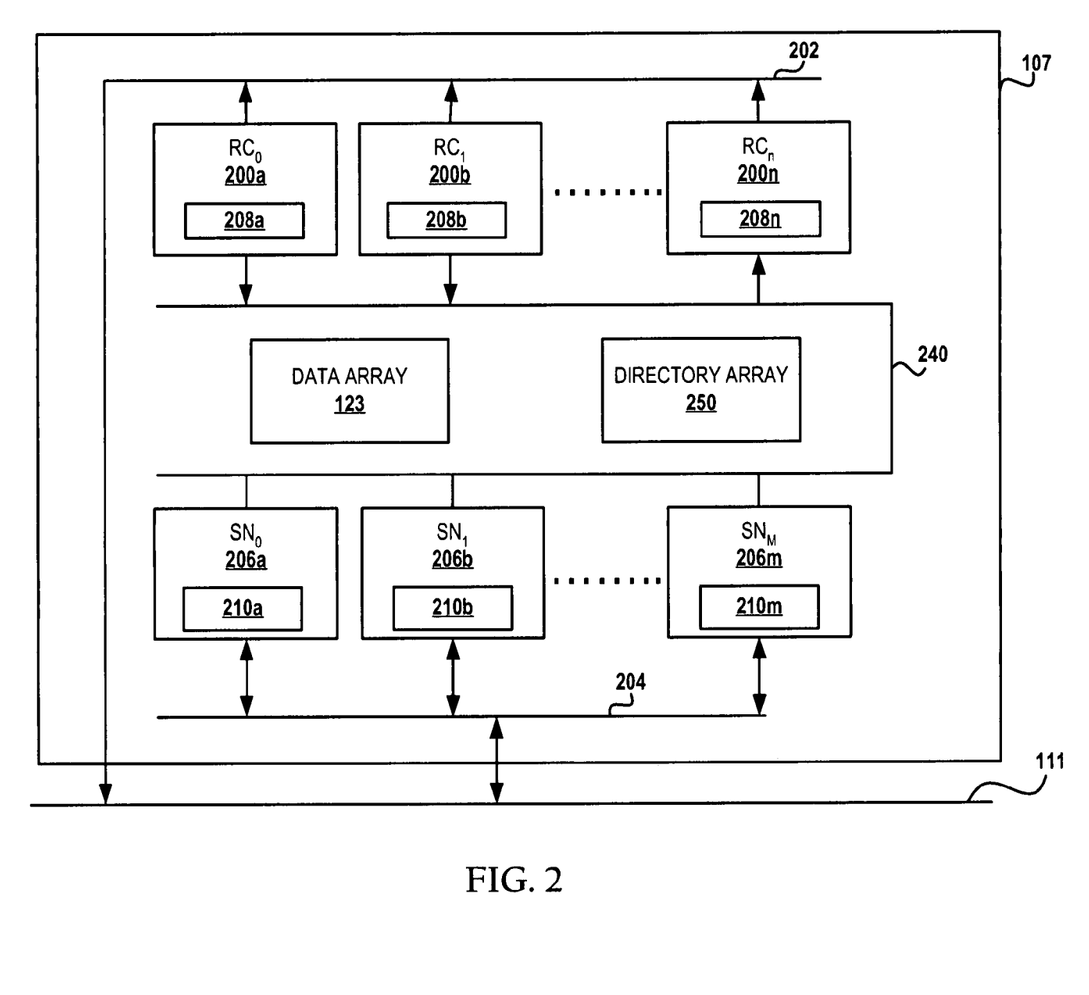
FIG. 2 is a block diagram depicting major components of a cache memory, including a cache directory with coherency bits and pointers for tracking coherency states of cache lines, including the chained coherency states, according to one embodiment of the present invention.

FIG. 2 illustrates an exemplary L2 cache 107 utilized to complete the various cache line data transfers and data coherency operations described herein. L2 cache 107 includes data array 123 and directory array 250, along with multiple Read-Claim (RC) machines 200a-200n and multiple snoopers 206a-206m. Data array 123 comprises one or more cache lines 126 in which blocks of data are stored. Directory array 250 comprises a plurality of address registers (not shown) in which the real addresses of corresponding data in the data array 123 are stored. Directory array 250 also comprises coherency registers (not shown), which hold the current coherency state (e.g., the MESI sates) for an associated cache line.

Each RC machine 200a-200n includes a corresponding intermediate state register 208, within which the RC Machine 200a-200n holds the chained intermediate coherency states. RC complete bus 240 connects the output of each RC machine 200a-200n to respective snoopers 206a-206m. Snoopers 206a-206m communicate with system interconnect 111 via snooping bus 204. Associated with each snooper 206a-206m is a directional/routing register 210a-210m, within which the forwarding identifier (FID) of the next chained processor is held during chained coherency operations. Intermediate state registers 208a-208n and directional registers 210a-210m comprise a number of bits for storing the chained intermediate coherency states and routing data for the next chained processor, respectively.

To enable transfer/forwarding of data to the next processor cache in a coherency chain, some method of tracking/recording the forwarding identifier (FID) or routing information of the next processor is required. In one embodiment of the invention, the directional registers 210a-210m provide this tracking feature. In another implementation, however, the chained coherency states provide the additional function of indicating the direction/address/ID of the processor to which the requested data is to be forwarded. With this implementation, the number of coherency bits in the intermediate coherency states is expanded to support both the intermediate states and the addressing function.

The number of coherency bits required to track the coherency states are calculated based on the total number of states using a binary allocation. Thus, for 4 states, only 2 bits are required, for 8 states, 3 bits, etc. With the chaining of homogenous operations, ten total coherency states are provided (M, E, S, I, $M_R$, $M_F$, $S_R$, $S_F$, $S_{NC}$, $M_{NC}$) requiring at least 4 coherency bits.

In the illustrated embodiment, the directional data (or FID) are stored within the directional registers 210a-210m, while the intermediate state registers 208a-208n maintain only the chained coherency states. The pointer within the directional registers 210a-210m identify to the cache which downstream device has the next access to the cache line, and the cache controller forwards the cache line to the downstream device indicated therein. The pointer comprises sufficient bits to uniquely identify each processor/device within the entire system that is capable of requesting access to a cache line.

Creating the Chain and Last-in-Chain Ownership

For illustrative purposes, the invention is described with reference to the three processors, $P_1$, $P_2$, and $P_3$ of FIG. 1 and the exemplary cache of FIG. 2. The caches are assumed to be non-blocking and support multiple outstanding misses. Each cache 107 comprises an RC state machine 200a-200n, utilized to maintain information about each outstanding miss. RC state machine 200a-200n determines when to issue an operation on the system bus based on whether the operation hits or misses at the local processor cache. When the request misses at the local cache, RC state machine 200a issues the operation on the system bus and the operation is snooped by snoopers of the other processors.

As indicated, the cache 107 also comprises a plurality of snoopers (SN) 210a-210m, which detect operations placed on the system bus from other processors and responds to the detected operations by providing coherent data (if present in the cache), issuing a retry (if the snooper is currently busy), or issuing a null response (if the data is not present). The processors share a snooping bus 204 operating under the chained intermediate coherence protocol. At any given time during processing, one or more of the processors may issue a load or store request for a particular cache line. When that processor's L1 and L2 caches do not contain the cache line (i.e., the request misses at the directory of the requesting processor's caches), the request is issued via bus 202 as an address tenure on the system interconnect 111. The address tenure is snooped by the snoopers of other caches, and, in the illustrative embodiment, the last chained cache (i.e., the cache having last-in-chain ownership of the cache line data), if present, responds to the request.

According to the invention, the last chained cache is identified as a cache whose cache controller logic displays the cache line in one of several chained intermediate coherency states (e.g., a received state—$M_R$, $S_R$ or an end of chain state $M_{NC}$, $S_{NC}$). If no last chained processor is present, a cache with the line present in one of the non-chained MESI states or the memory controller responds to the request. This transaction forms the beginning of a potential chain of caches.

Since each processor issues requests independent of each other, P2 may issue a request for a cache line in the shared or S state in P1's cache followed by a similar request by P3. Because the address bus serializes such requests, the request by P2 will be snooped by P1 first. At the time the P2 request is snooped by P1, P1 may be waiting to receive the cache line data from memory. However, P1 responds to P2's request (as long as it is a homogenous operation) and indicates that P1 will be providing the data to P2 once the data has arrived at P1 and has been processed. P1 queues (or chains) P2 as the processor to which to forward the data when the data is later received and processed by P1. RC machine 200 in P1 is tagged with intermediate state $M_F$ or $S_F$ at intermediate state register 208 to indicate that the data should be forwarded, and snoop machine 206 stores an identifier indicating P2 as the next processor in the chain in directional register 210. In addition, snoop machine 206 on P1 is started to intervene data to P2 and stores information about which RC machine 200 on P1 to monitor for completion of the data tenure in P1 before forwarding the data to P2.

P1 also provides a response to the P2 request indicating that P1 has passed last-in-chain ownership to P2. P2 then assumes the role of the last chained processor and owner of the cache line (for snooping purposes) by setting the intermediate cache state at RC machine 200 to $M_R$ or $S_R$ and waiting for the data tenure from P1 to provide the data. Eventually, the data from memory arrives in P1's cache and is processed and passed along to the P1's L1 cache 105 and processor core 103. Once the data is completely processed at P1, RC machine 200 in P1 signals snoop machine 206 via RC complete bus 240 to commence a data tenure to provide the data to P2. Once snoop machine 206 completes the data tenure, the cache line state is set to S or I depending on whether the chained transaction was for a READ or RWTIM/DLCAIM operation respectively. Once the data tenure to P2 is completed, RC machine 200 and SN machine 206 on P1 as well as RC machine 200 on P2 are released to process subsequent operations.

When P3's request is seen on the bus, P1 does nothing since P1 has already queued P2 as the next processor in the chain and the intermediate coherency state of P2 as recorded at RC machine 200 has been updated to $M_R$ or $S_R$ to reflect that P2 is the last chained processor. When the P3 request is snooped by P2, P2 (as was done by P1 previously) records the intermediate state of $M_F$ or $S_F$ at RC machine 200 and records P3 as the next processor in the chain at snoop machine 206. P2 also provides a response indicating to P3 that it is the current last-in-chain processor, and P3 records this via intermediate state $M_R$ or $S_R$ at RC machine 200. When the data tenure is completed and processed at P2, snoop machine 206 at P2 intervenes the data to P3 and sets the cache state in P2 to either S or I respectively for operations initiated by a load or store instruction. Forward progress by the processors is guaranteed since the processors will first return data (for loads) or modify the line (for stores), before satisfying the queued data tenure to the subsequent processor in the chain.

Chained Coherency Protocol/States for Sequential Homogenous Operations

To enable tracking of the above processing involving sequential processor requests, last-in-chain ownership, and subsequent transfer of data to requesting processors, the invention introduces a chained coherency protocol with several new coherency states, referred to as chained intermediate coherency states. These chained intermediate coherency states extend the conventional MESI states of the MESI protocol and provide additional states named according to the operations linking the MESI states. According to one alternate embodiment, the chained intermediate coherency states may also contain routing information (identified herein with numbered subscript "x") to point to the next processor in the chain.

A summary of these chained-coherency states, their definitions, and functional applications are provided in Table I below. Table I provides a list of the chained coherency states for homogenous operations. The chained-coherency protocol includes the conventional MESI states, the functionality of which are known to those skilled in the art and are therefore not specifically described within the respective tables.

TABLE I

CHAINED INTERMEDIATE COHERENCY STATES

| CHAINED COHERENCY STATES | DEFINITION | APPLICATION/FUNCTION |
| --- | --- | --- |
| $M_R$ | Modified-waiting to receive data; (also represents the end-of-chain ownership) | Indicates that the current cache is the end of the chain and is waiting for a copy of the cache data to be delivered to it for modification. Once the data is delivered, the storage update will be processed and the cache state will be written to M. |
| $M_{FX}$ | Modified Forwarded | Indicates that the current cache is not the end of the chain and is waiting for a copy of the cache data to be delivered to it for modification. Once the data is delivered, the storage update operation will be completed and the directory in this cache will be written to I. In addition the line will be forwarded to the cache for processor Px. |
| $S_R$ | Shared waiting to receive; (also represents the end-of- | Indicates that the current cache is the end of the chain and is waiting for a copy of the cache data to be |

TABLE I-continued

CHAINED INTERMEDIATE COHERENCY STATES

| CHAINED COHERENCY STATES | DEFINITION | APPLICATION/FUNCTION |
|---|---|---|
| | chain ownership) | delivered to it to satisfy a load instruction. Once the data is delivered and forwarded to the processor core, the cache directory state will be written to S. |
| $S_{FX}$ | Shared forwarded | Indicates that the current cache is not the end of the chain and is waiting for a copy of the cache data to be delivered to if to satisfy a load instruction. Once the data is delivered, the load is satisfied and the directory in this cache will be written to S. In addition, the line will be forwarded to the cache for processor $P_x$. |
| $S_{NC}$; $M_{NC}$ | Shared not chained; Modified not chained | These states are used to terminate a chain in the presence of non-homogenous operations. A $M_R$ state is converted to a $M_{NC}$ state when an $M_R$ cache snoops a READ operation (the non-homogenous READ operation encountered a store chain of caches). Likewise an $S_R$ cache state is converted to an $S_{NC}$ state when a $S_R$ cache snoops a RWITM or DCLAIM operation. Once a cache is converted to $M_{NC}$ or $S_{NC}$, all subsequent operations to the line are retried until the chain completes and the $S_{NC}$ or $M_{NC}$ cache is updated to S or M respectively. |

The $M_R$ and $S_R$ states are states assigned to a cache line of a processor given future/downstream ownership of (or access to) the cache line before the data is actually available at the sourcing cache. As provided within Table I, the $M_R$ and $S_R$ states indicate that the cache has downstream (last-in-chain) ownership of the cache line but must wait to receive the data from a memory controller or a previous cache (either a cache sourcing data from a normal MESI state or a previous cache in the chain). The $M_F$ and $S_F$ states, meanwhile, indicate that the cache has passed the downstream/last-in-chain ownership to a next processor's cache and is going to forward data received to that next processor's cache. The $M_F$ and $S_F$ states also record the location of the next processor in the chain within the system.

The first processor in the chain (or the forwarding processor) and each subsequent processor tracks which subsequent processor was given ownership of the line. This involves recording which processor's request was first snooped and sent a combined response, and automatically forwarding the cache line to the selected processor's cache when the cache line data arrives in the snooper's cache.

To track subsequent processors in the chain, the $M_F$ and $S_F$ states include a tag that uniquely identifies the processor to which the data is to be forwarded. For example, the $M_F$ and $S_F$ states can be represented as $M_{F2}$ and $S_{F2}$, where the 2 indicates to forward data to processor 2. In general, the $M_F$ and $S_F$ states are represented by $M_{FX}$ and $S_{FX}$, with X being the identifier of the next processor in the chain. The destination processor for a subsequent request for the cache line is identified by the routing tag on the $M_F$ and $S_F$ states.

If another processor/device requests the cache line before the entire data has been received in the cache line, the requesting processor is made to go the $M_R$ or $S_R$ state and the first processor goes to the $M_{FX}$ (Modified Data to be forwarded) or $S_{FX}$ (Shared Data to be forwarded) coherency state where X identifies the requesting processor. When the data arrives at the cache line tagged with $M_F$ or $S_F$, the arriving data is processed accordingly, and the cache state is then set from $M_F$ or $S_F$ to I or S, respectively. The data is also forwarded to the requesting processor to which the downstream ownership of the cache line was given, i.e., the processor with the cache line currently in the $M_R$ or $S_R$ state. Then, the downstream cache is set to the M or S state, respectively if the downstream cache is still in the $M_R$ or $S_R$ state. If, however, the downstream cache has passed on downstream ownership to another cache, and the downstream cache is in the $M_F$ or $S_F$ state, the data transfer continues down the chain.

As described above, homogenous operations involve the same/similar operations chained together (e.g., RWITM chained to RWITM and READ chained to READ). In the homogenous implementation, each processor only needs to know which processor, if any, is immediately after it in the chain. Once there is another processor in the chain, the processor commits to forward the cache line data once the data is received and the local operations with that data are completed.

Figure 5:
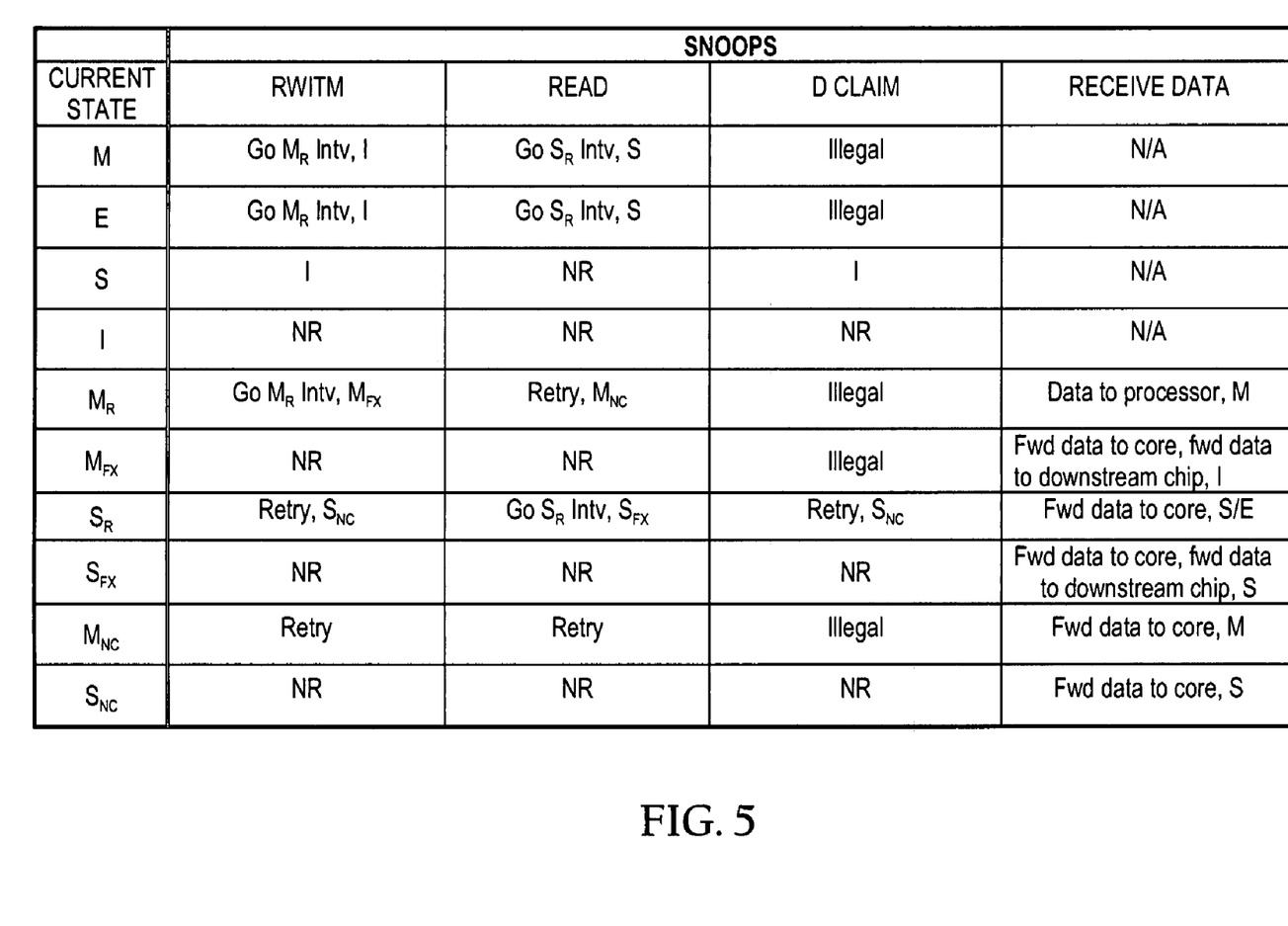
FIG. 5 is a chart which summarizes the operations that triggers the transitions between the standard MESI coherency states and the states of the chained-coherency protocol.

FIG. 5 summarizes which operations trigger the transitions between the states of the chained homogenous coherency protocol. Column 1 provides a list of initial states within the cache. Row 1 (R1) provides the list of possible operations that may be snooped by the snooper. The following rows, read horizontally from the second column, depict the transitions from the initial state (column 1) to the subsequent states as the operations of RI are snooped by the snooper. Within the table, "NR" indicates a No-response condition when a snooped operation does not change the coherency state of the cache line. Also, "NA" (not applicable) indicates that a particular operation is not applicable to the coherency state protocol, and that label is utilized with the normal MESI states, since the receipt of data does not trigger any changes in the normal MESI coherency protocol. "Illegal" indicates that the particular operation will not occur when the cache line is in the initial state. For example, no DClaim operation is placed on the bus when the cache is in either the M, E, $M_R$, $M_{FX}$, or $M_{NC}$ states.

An example of how the row of operations and responses thereto should be read from the table is as follows. The example utilizes the row of operations/transitions for initial state $M_R$. When the snooper snoops a RWITM (col. 2) while the cache is in the $M_R$ state, the snooper issues a Response of go $M_R$ intervention and transitions the intermediate cache state to $M_{FX}$. The snooper prepares to intervene the data to the cache from which the RWITM operation originated. If the snooper snoops a Read operation while the cache is in the $M_R$ state, the snooper issues a Retry response and transitions the intermediate cache state to $M_{NC}$, since the snooper is not design to handle chaining of non-homogenous operations. DClaims are illegal while in the $M_R$ state. Finally, if data is received while the cache is in the $M_R$ state, the data is forwarded to the processor core and the coherency state transitions from $M_R$ to M. The M state is logged within the cache directory.

According to the illustrative embodiment, snooped operations that are non-homogenous within the sequence of operations are not allowed to be chained to the homogenous chain, and the last-in-chain ownership state is replaced by a specific state terminating the chaining of additional processor operations. These states are the last states provided within Table I, i.e., $S_{NC}$ and $M_{NC}$. When a last chained processor snoops a non-homogenous operation, the intermediate cache state of the processor that is last-in-chain (i.e., the $M_R$ or $S_R$) is automatically changed to an end-of-chain state. In the illustrated embodiment, the requesting processor is sent a retry response and the chain is stopped. No other processors are allowed to be chained to the last chained processor.

Figure 3A:
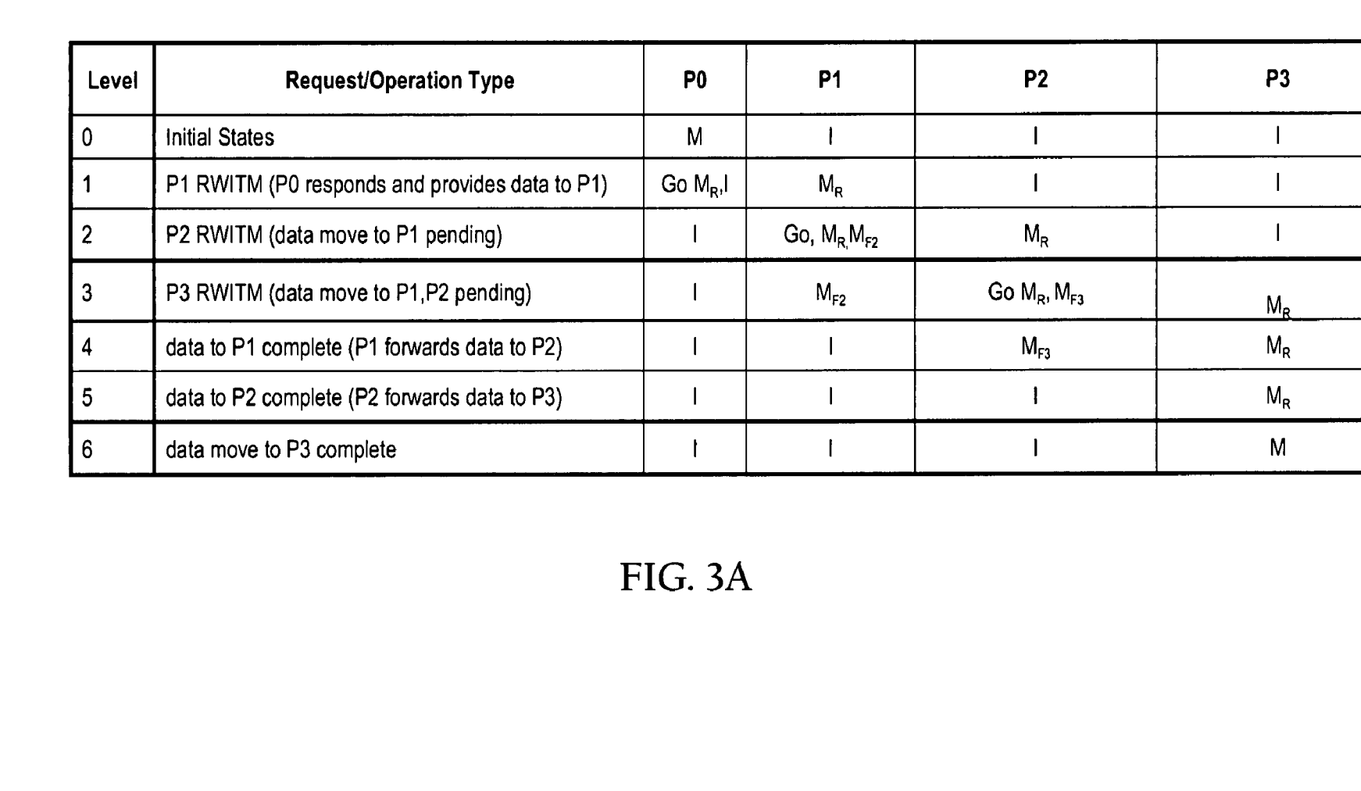
FIG. 3A is a chart illustrating the various transitions in chained intermediate coherency states and associated homogenous RWITM operations according to one illustrative embodiment of the present invention.
Figure 3B:
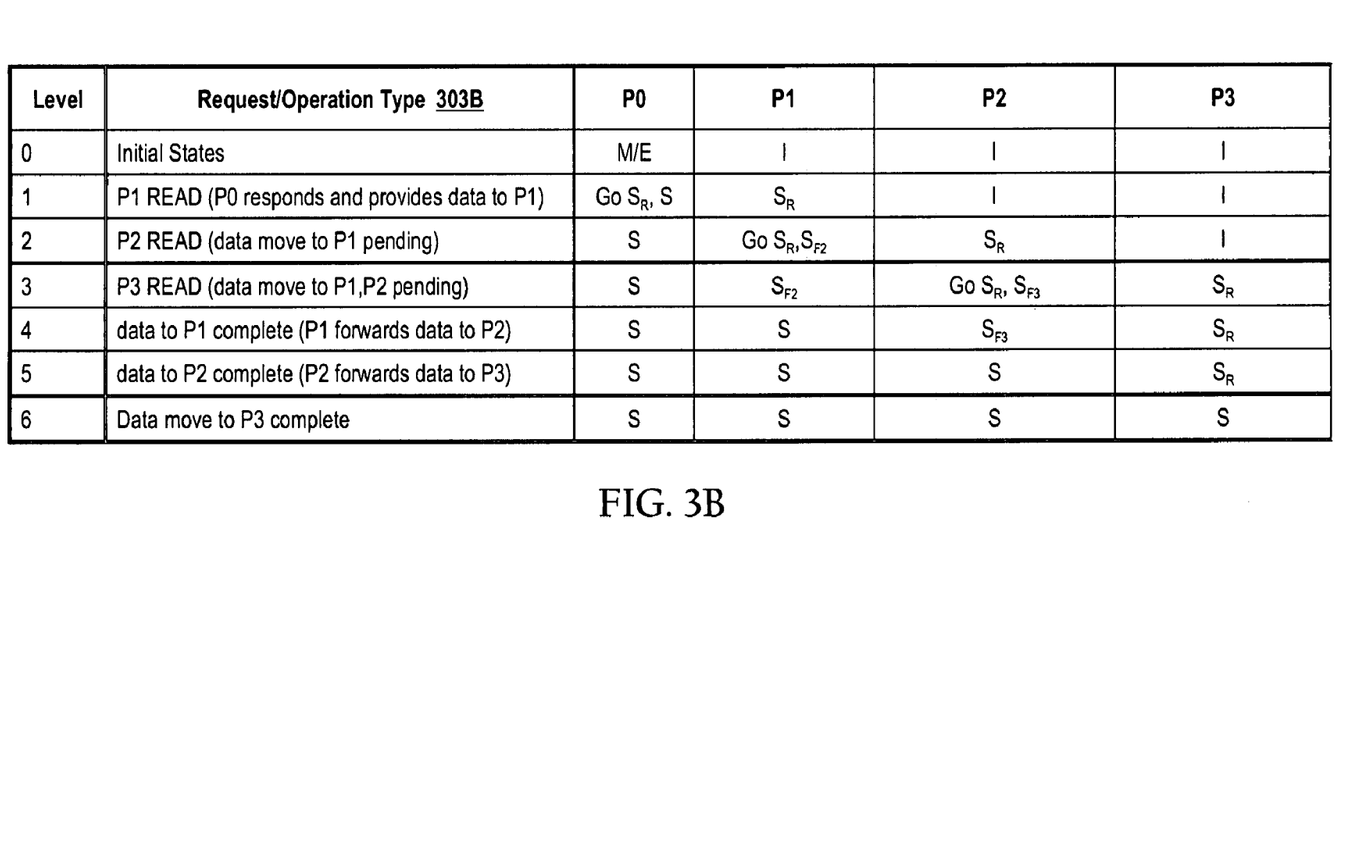
FIG. 3B is a chart illustrating the various transitions in chained intermediate coherency states and associated homogenous READ operations according to one illustrative embodiment of the present invention.

Turning now to FIGS. 3A and 3B, there are illustrated two charts illustrating a process of chaining processors of an MP during a sequence of homogenous operations and the corresponding transitioning of the chained intermediate coherency states in response to the chaining process. The MP utilizes the chained coherency protocol presented in Table I above. FIG. 3A provides the coherency responses for a homogenous sequence of RWITM operations, while FIG. 3B provides the coherency responses for a homogenous sequence of Read operations. Both figures reflect how specific processor operations of the three example processors, P1, P2 and P3, trigger transitions from one chained intermediate coherency state to another. A forth processor, P0, is provided as a sourcing processor that begins the chain. For simplicity, the description provided below covers the transitions illustrated by FIG. 3A, which depicts a homogenous sequence of RWITM operations. A similar description is applicable to FIG. 3B, which illustrates a homogenous sequence of Read operations.

As shown within FIG. 3A, each of the four processor columns (P0-P3) depict the current coherency state of the particular processor as the request/operations provided in the second column (targeting a single cache line) is snooped on the system bus of the MP. Each processor column (e.g. P1) tracks the transition that occurs at that processor (e.g., I $M_R$, $M_{F2}$, $M_{F2}$, I, I, I read vertically downwards within the column) as the request/operation is snooped by that processor.

Each row within the table is identified as a numbered level (i.e., level 0, 1, 2, . . . ). The first row (Level 0) of the table of FIG. 3A, represents the initial states of the processors, before chaining occurs. The cache line within P0's cache is in the M state, while the corresponding cache line in the caches of P1, P2 and P3 are in the I state. Homogenous operations are assumed to be issued from the processors in sequence, relative to the numbering of the processors (i.e., P1, followed by P2, followed by P3). Chaining of intermediate coherency states occurs whenever the operation of the next processors requesting access to (or ownership of) the cache line (to read or modify the line) before the processor with current ownership of the line has completed processing the received data. Each intermediate coherency state is assigned and changed when either a request is snooped and chained or data associated with the cache line is received and processed by the processor. The intermediate coherency states are then utilized by the various snoopers to track the sequence of processor operations, allocation of downstream ownership/access to the data, and subsequent data transfer.

At level 1, P0 snoops a RWITM issued by P1 on the system interconnect. As shown, the coherency states for P0 and P1 transition to I and $M_R$, respectively. Level 2 then shows the transitions that occur when P2 then issues a RWITM. Since the data has not been forwarded to P1 (i.e., data not yet received and processed by P1), P1's snooper issues a response, which chains P2 as the last in chain, and the intermediate coherency states of P1 and P2 are changed to $M_{F2}$ and $M_R$, respectively. When P3 then issues a RWITM, as shown at level 3, P3's cache state changes to the $M_R$, while P2's cache state changes to $M_{F3}$. The chained relationship among the four processors is illustrated at level 3. As each chained processor completes operation with the data and forwards the data on to the next chained processor, the coherency states of the completed processors transitions to I, as illustrated by levels 4 and 5. Notably, when the last in chain processor (P3) completes operation with the data, the coherency state of the cache is changed to M and stored in the cache directory. With FIG. 3B, completion of operations on the Read data results in a Shared (S) cache state being allocated to each processor within the chain. The above described embodiment with specific numbered processors operating in numeric sequence is provided for illustration only and not meant to be limiting on the invention.

In order to prevent the chain from repeating within itself, no processor that is currently within a chain is permitted to rejoin the chain. Thus if P1 is waiting on data for a cache line, P1 is prevented from chaining a new request for the same cache line to the existing chain. Rather, P1 is made to wait until it receives the data and then P1 can read or modify the data as necessary. However, once a processor has been removed from the chain (e.g., P0 and P1 at level 4 and P2 at level 5), that processor may rejoin the chain.

Figure 3C:
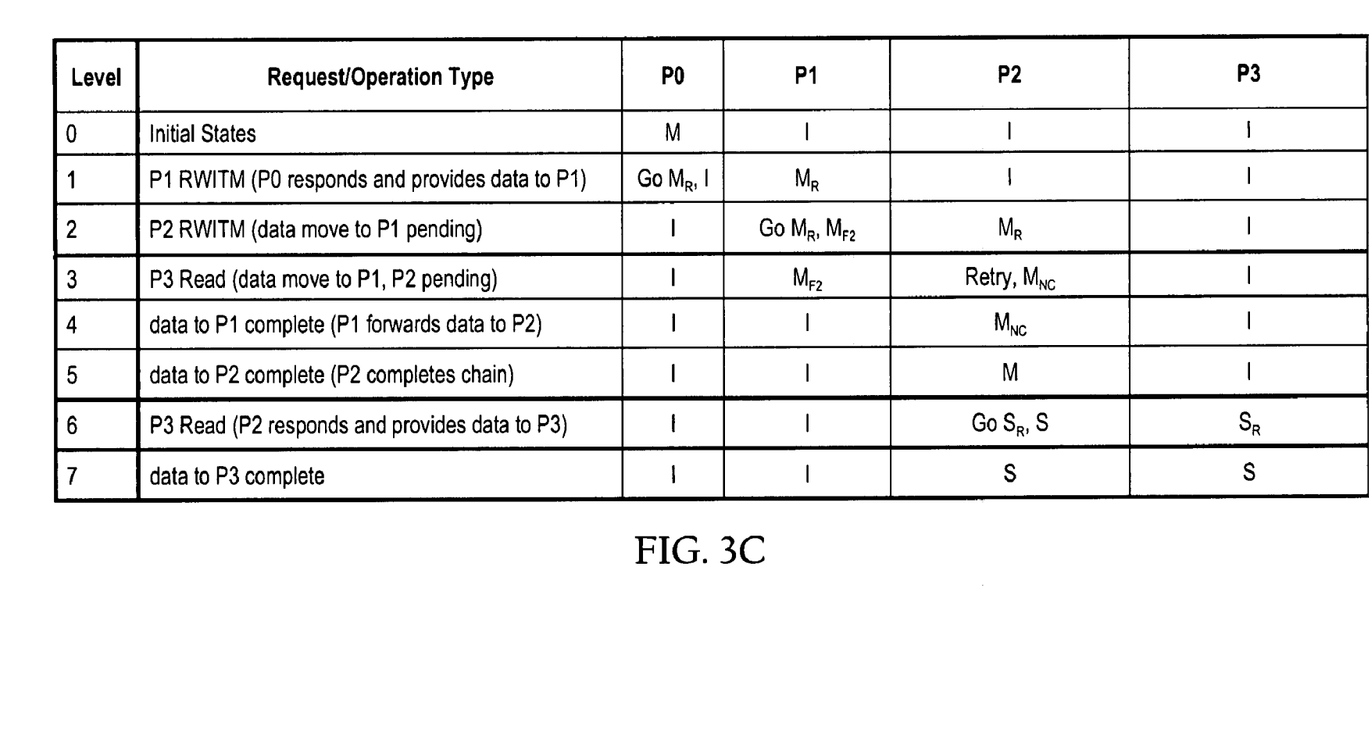
FIGS. 3C and 3D are charts illustrating the system response to receipt of a non-homogenous operation during a respective chaining of homogenous RWITM and READ operations.
Figure 3D:
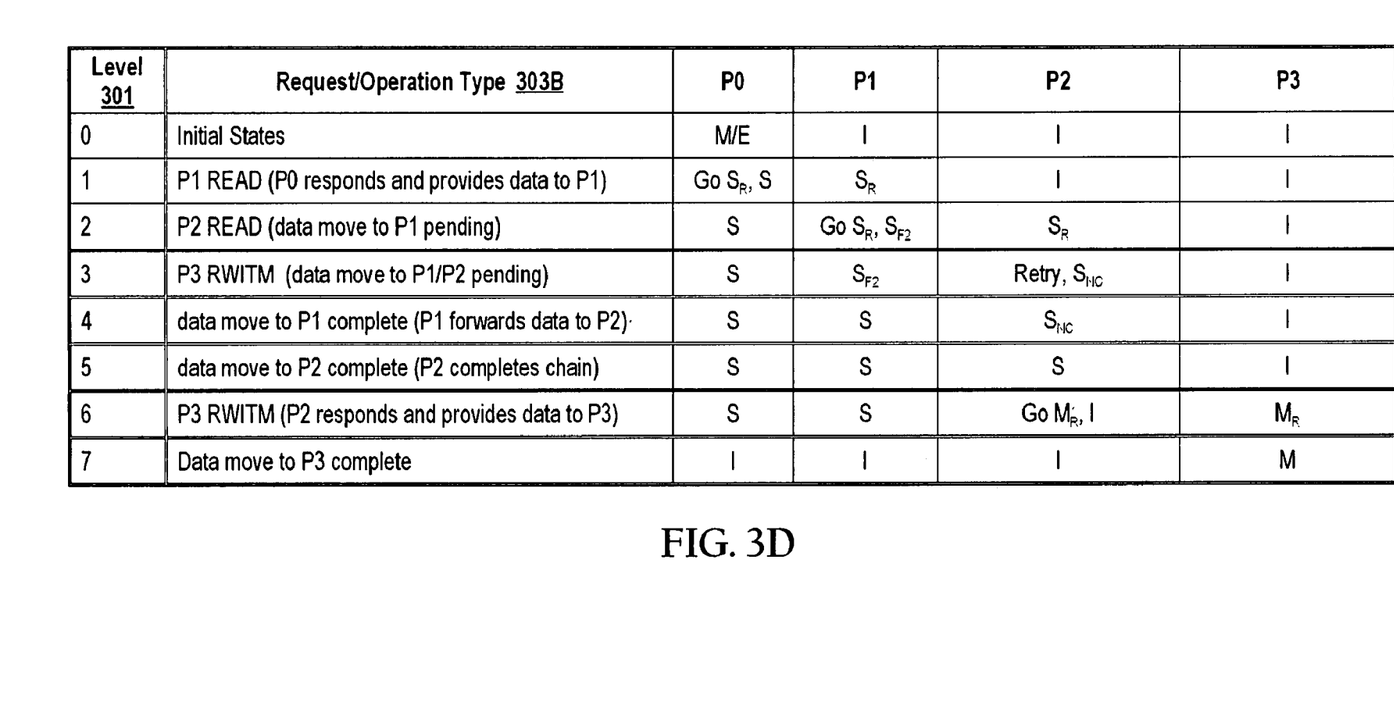

Also, with the chaining of homogenous operations, no chained transition from S to M state or vice versa is allowed. FIGS. 3C and 3D are charts which illustrate the responses to a snoop of a non-homogenous operation by a last in chain processor (i.e., a processor in the $M_R$ or $S_R$ state) within a homogenous chain. FIG. 3C provides the response for a snoop of a Read by a processor within a RWITM chain, while FIG. 3D provides the response for a snoop of a RWITM by a processor within a Read chain. Whenever a chained RWITM snoops a Read or a chained Read snoops a RWITM, the last chained processor changes the intermediate coherency state of the cache line to reflect that the chain has been stopped. These intermediate coherency states are the end-of-chain states (e.g., $M_{NC}$ or $S_{NC}$), that prevent a processor issuing a non-homogenous operation from being chained to the last processor in the previous chain. The chain is stopped by an $M_{NC}$ or $S_{NC}$ state, and the snooper continually retries the request until the data arrives in the last chained processor's cache and processing of the data is completed. Levels 3 through 6 of both charts illustrate the response to a non-homogenous operation. With FIG. 3C, the snooper first issues a Retry response to P3 (level 3) and only allows the request to be successful when P2 has received and completed processing the data. Once the chained operations are completed, and the non-homogenous operation is snooped again, the snooper responds to the non-homogenous operation as an opportunity to start a next chain, as is indicated at level 6.

Figure 4A:
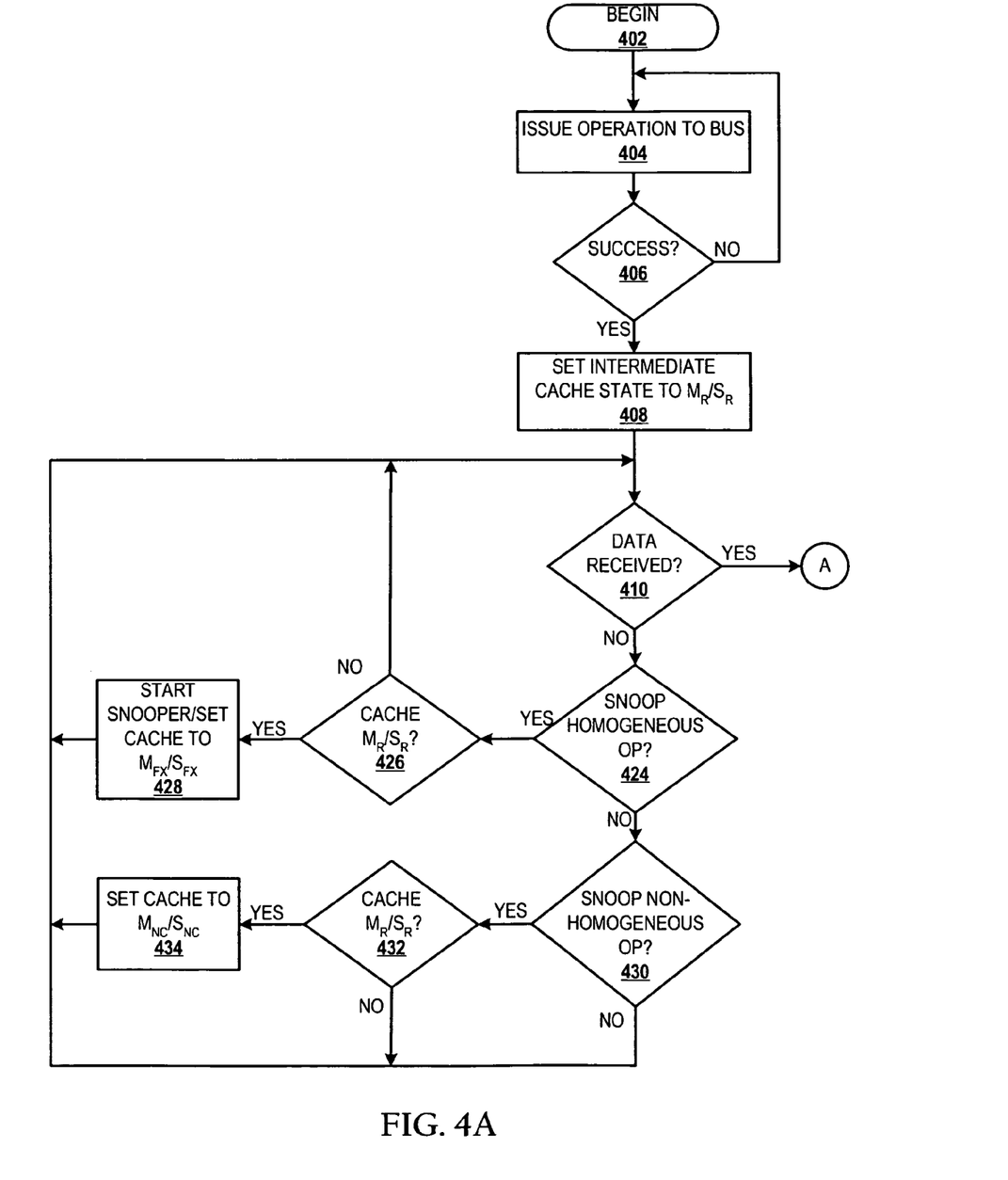
FIG. 4a-b are flow charts illustrating the operations by which transitioning between chained intermediate coherency states are completed for homogenous operations in accordance with one implementation of the invention.
Figure 4B:
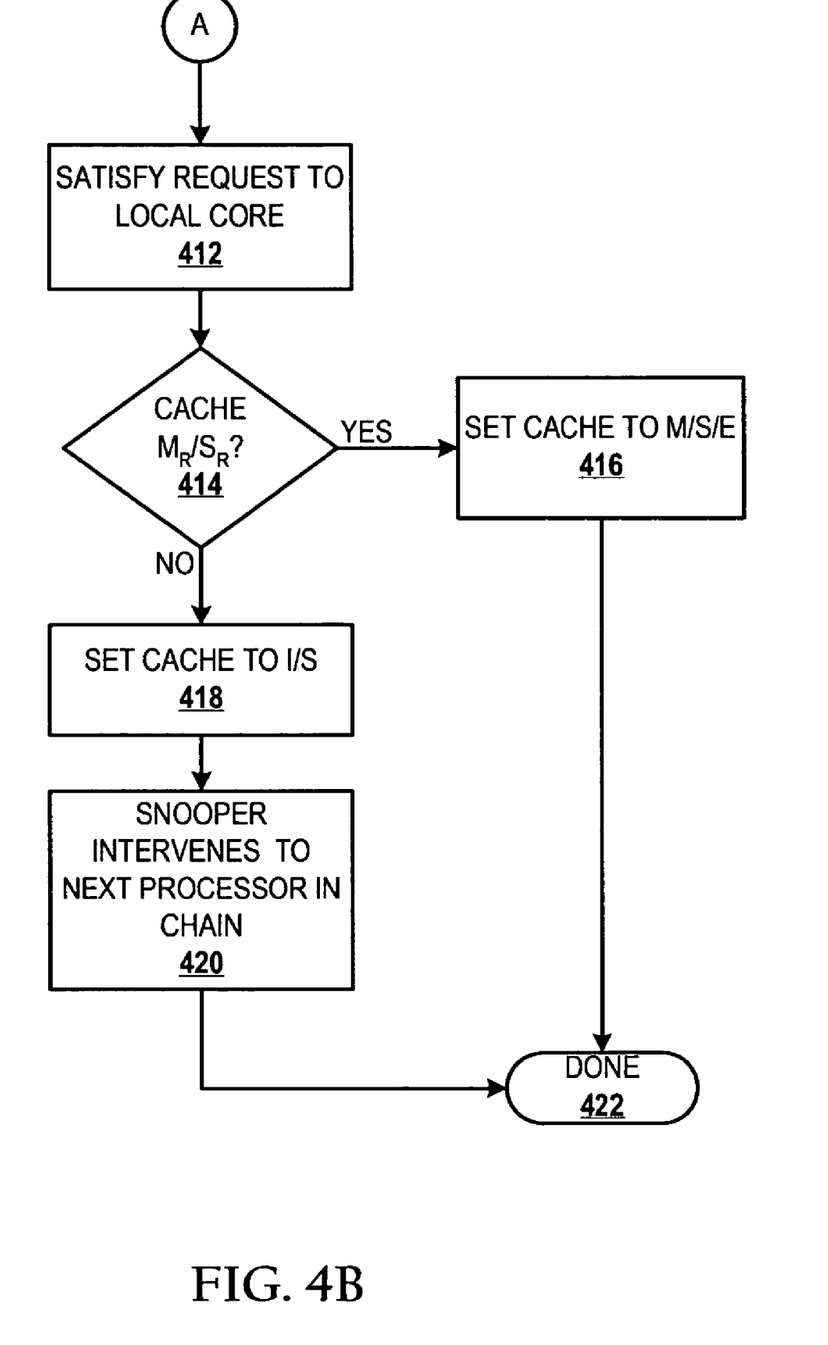

FIGS. 4a-b provide a flow chart summarizing a specific instance of general data operations and associated chained intermediate coherency responses during homogenous data operations within a multiprocessor system such as the MP of FIG. 1. As shown, the process begins at block 402 and proceeds to block 404 at which the RC machine (of P1, for example) issues an operation to the system bus and waits for a response. A check is made at block 406 whether the response indicates the operation was a success. If the operation was a success, the RC machine sets the intermediate cache state to $S_R$ (when the operation was a READ) or $M_R$ (when the operation was a RWITM/DCLAIM), a shown at block 408.

Then, a check is made at block 410 whether the data has arrived at P1. If the data has arrived, the RC machine forwards the data to the core to satisfy the core's request, as depicted at block 412. Then, the RC machine checks at block 414 whether the intermediate cache state is $S_R$ (when the operation was a READ operation) or $M_R$ (when the operation was a RWITM/DCLAIM operation). If not, the RC machine sets the cache state to S (when the operation was a READ and data is sourced from a cache)/M (when the operation was a RWITM/DCLAIM)/E (when the operation was a READ and data is sourced from the memory controller) at block 416. However, if the intermediate cache state indicates forwarding to another cache, the RC machine sets the cache state to S (for data being stored at the next chained cache)/I (for data being modified at the next chained cache) at block 418. Then, at block 420, the snooper intervenes the data to the cache identified as next in chain. The process then completes at block 422.

Returning to block 410, if the data has not arrived at the cache, a next determination is made at block 424 whether the snooper snoops a homogenous operation. If a homogenous operation is snooped, a check is made whether the cache is in intermediate cache state $S_R$ (when the operation was a READ operation)/$M_R$ (when the operation was a RWITM/DCLAIM operation), as shown at block 426. If the cache is at this intermediate state, the snooper is started and the intermediate state is set to $S_{Fx}$ (when the operation was a READ operation)/$M_{Fx}$ (when the operation was a RWITM/DCLAIM operation), as depicted at block 428. If the operation was a success, the RC machine sets the intermediate cache state to $S_R$ (when the operation was a READ operation) or $M_R$ (when the operation was a RWITM/DCLAIM operation), as shown at block 408.

If, however, the operation snooped is a non-homogenous operation (as determined at block 430), then a determination is made whether the cache is set to $S_R$ (when the operation was a READ operation)/$M_R$ (when the operation was a RWITM/DCLAIM operation) at block 432. If the cache is set to this state, the cache state is updated to $S_{NC}$ (when the operation was a READ operation)/$M_{NC}$ (when the operation was a RWITM/DCLAIM operation), as shown at block 434. In either case (i.e., snoop of a homogenous or non-homogenous operation), the snooper issues a response to the system bus, which response is utilized by the other processor from which the operation originates in completing its processing.

Summary

With the chained-coherency protocol, the cache controller of a requesting processor's cache is provided a future "ownership" of the cache line as soon as the address tenure completes, i.e., before the actual transfer of data is completed, and the processor can immediately stop re-issuing the request for the cache line. The processor may then proceed with operations involving the cache (except operations involving the cache line tagged with a chained coherency state) without having to first wait for the cache line data to actually arrive in the cache. Also, since the later processor requests and responses are address-only operations, they complete relatively quickly, and implementation of the new coherency tracking states releases the requesting processor from retrying the cache line access request.

Thus, the invention provides a response method and system for a data request that eliminates some retries for data not available within the sourcing caches. As a result, only a single request for the line is placed on the bus for the chained processors and the overall number of retries is substantially reduced. In addition, the invention reduces memory latency by permitting more requests to be handled by cache-to-cache transfers.

Implementation of the invention enables a further decoupling of the data bus from the address bus. The decoupling is particularly useful for systems with differing amounts of bandwidth. Further, the invention enables the latency of cache-to-cache data transfer to be hidden from other processor operations. The invention also eliminates the latency of waiting until the cache line has been populated with new data before changing the coherency state in the cache directory of the requesting processor.

The present invention can also be combined with other variations of the MESI protocol. Those skilled in the art will appreciate that more complex forms of coherency protocol are possible, such as a hybrid/extended version using additional states with different functional characteristics. Thus, while the invention focuses on the transitions to and from various chained coherency states, it is understood that the discussion of specific operations and/or transition states is not meant to be limiting on the invention. Other operations and resulting transitions among the various states may be possible and therefore fall within the scope of the invention.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining cache coherency in a multiprocessor data processing system (MP) having a plurality of processors and associated processor caches coupled together via a bifurcated system bus, said method comprising:

snooping, at a first processor, a request from a second processor for access to a cache line, for which the first processor has current ownership but has not yet received data of the cache line;

when said request is homogenous with a previous request issued by the first processor to obtain the current ownership of the cache line, issuing a response indicating that the ownership will be passed to the second processor once the data has been received at the first processor's cache; and contemporaneously setting an intermediate cache coherency state of the cache line within the first processor's cache to a first chained intermediate coherency state indicating that said first processor will forward the cache line data once the cache line data is received at said first processor's cache.

2. The method of claim 1, further comprising:
issuing the previous request for cache line data out on said system bus, said previous request being an address transaction of the first processor that is snooped by each of said plurality of processors that are coupled to said system bus, wherein said request is snooped at a third processor, which maintained first ownership of the cache line at the time said previous request is snooped, and which issues a previous response indicating that ownership will be passed to the first processor once the data has arrived at the third processor's cache;
responsive to a receipt of the previous response, immediately setting an intermediate coherency state to a second chained intermediate coherency state that indicates that said first processor is waiting to receive cache line data from the third processor and has chained ownership to respond to snooped homogenous operations for said cache line data, wherein no retry of the previous request is required.

3. The method of claim 2, further comprising:
changing said second chained intermediate coherency state to the first chained intermediate coherency state following said snooping of said request.

4. The method of claim 1, further comprising:
linking a forwarding identifier (FID) of said second processor with said first chained intermediate coherency state, wherein said FID is utilized to determine to which processor said cache line data is to be forwarded when said cache line data is received at said first processor's cache; and
when data is received and said first processor is in the first chained intermediate state, forwarding said cache line data to a processor identified by said FID.

5. The method of claim 1, further comprising:
determining whether the snooped request for said cache line data is homogenous to said previous request, whereby chaining of ownership is completed only in response to a snooped request that is homogenous to said previous request.

6. The method of claim 5, wherein, when said snooped request is not homogenous to said first request, said method further comprises:
terminating a further allocation of chained ownership to an existing chain of processor requests;
changing a coherency state of said cache line data within said first processor's cache to an end-of-chain state, which indicates that said first processor is a last processor allocated ownership with chained ownership; and
retrying all subsequent request for said cache line data until said cache line data is received within said first processor's cache.

7. The method of claim 1, further comprising:
receiving said cache line data within said first processor's cache; and
completing processor operations involving said cache line data at said first processor; and
forwarding said cache line data to said second processor's cache.

8. The method of claim 7, wherein:
when said first and said second processor requests are read-with-intent-to-modify (RWITM), said completing step comprises forwarding said cache line data to a processor core of the first processor for processing and finalizing the data operation at the processor core; and
when said first and said second processor requests are READs, said forwarding step is initiated contemporaneously with said cache line data being received at said first processor cache.

9. The method of claim 8, wherein:
when said first and said second processor requests are read-with-intent-to-modify (RWITM) requests, said method further comprises changing a coherency state of said cache line data within said first processor's cache to an Invalid (I) state when said cache line data is forwarded;
when said first and said second processor requests are read-with-intent-to-modify (RWITM) requests and said data is received at said first processor's cache prior to a snoop by said first processor of a RWITM request, said method further comprises changing a coherency state of said cache line data within said first processor's cache to a Modified (M) state;
when said first processor and said second processor issues READs, said method further comprises changing a coherency state of said cache line data within said first processor's cache to a Shared (S) state when said cache line data is forwarded to the second processor's cache; and when said first and said second processor requests are READs and said data is received at said second processor's cache prior to a snoop by said second processor of a read-only request, said method further comprises changing a coherency state of said cache line data within said second processor's cache to a Shared (S) state.

* * * * *